United States Patent [19]
Jaeger

[11] 4,043,701
[45] Aug. 23, 1977

[54] SAFETY SHIELD ASSEMBLY

[76] Inventor: Ben E. Jaeger, Rte. 2, Box 49, Plano, Ill. 60545

[21] Appl. No.: 687,930

[22] Filed: May 19, 1976

[51] Int. Cl.² ............................................. B23B 47/00
[52] U.S. Cl. .................................. 408/241 G; 51/269
[58] Field of Search ............... 408/241 G, 241 R, 710, 408/67; 51/268, 269, 272, 274; 83/860, 440.2; 144/251 R

[56] References Cited

U.S. PATENT DOCUMENTS 2,648,239 8/1953 Bechler ........................ 408/241 G

FOREIGN PATENT DOCUMENTS

| 568,432 | 4/1945 | United Kingdom | 408/241 G |
| 560,738 | 4/1944 | United Kingdom | 408/241 G |
| 1,069,836 | 5/1967 | United Kingdom | 408/241 G |

*Primary Examiner*—Leonidas Vlachos
*Attorney, Agent, or Firm*—Gary, Juettner & Pyle

[57] ABSTRACT

A shield assembly to be positioned between a work area of a machine tool and an operator station is characterized by a unitary, generally U-shaped transparent sheet of a durable polymer having a planar front center portion and side legs diverging therefrom. One of the side legs is equipped with a handle and is secured to one end of a universal support arm, the other end of which is mountable to the machine remote from the work area.

The handle and universal arm enable the shield to be quickly and positively moved between positions adjacent and remote from the work area. When adjacent, the center portion of the shield extends across the front of the work area and the side legs extend rearwardly across opposite sides thereof to form an effective barrier to the passage therepast of chips, broken tools, coolant, etc., ejected from the work area.

6 Claims, 3 Drawing Figures

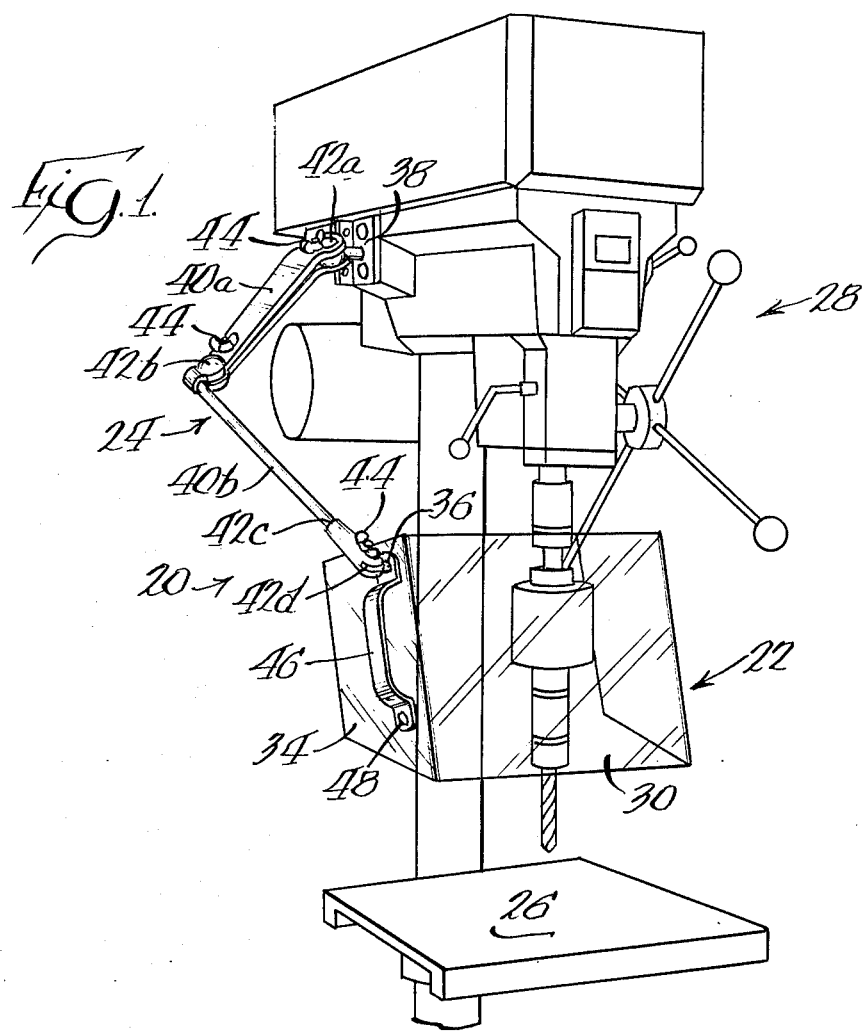
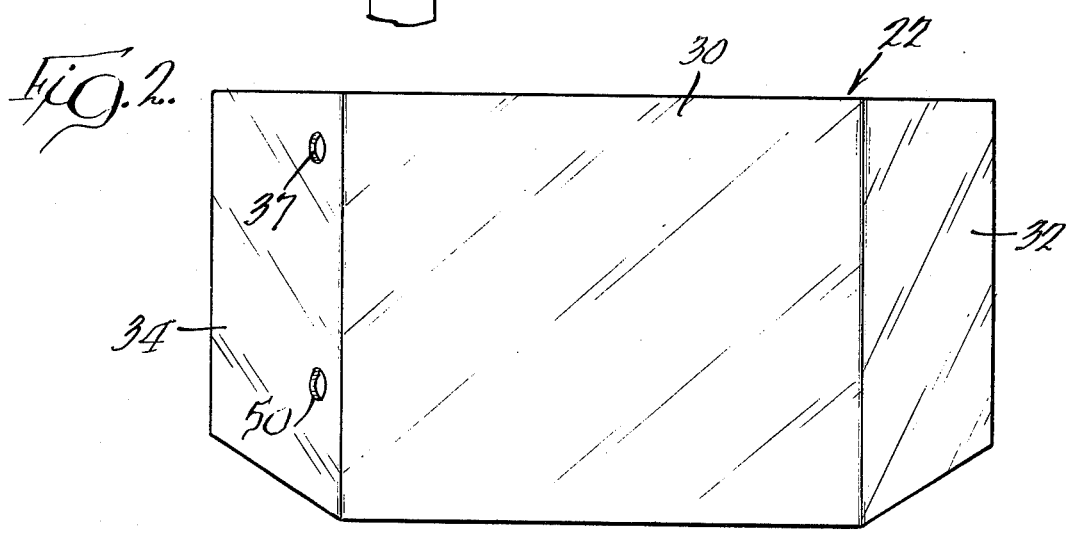
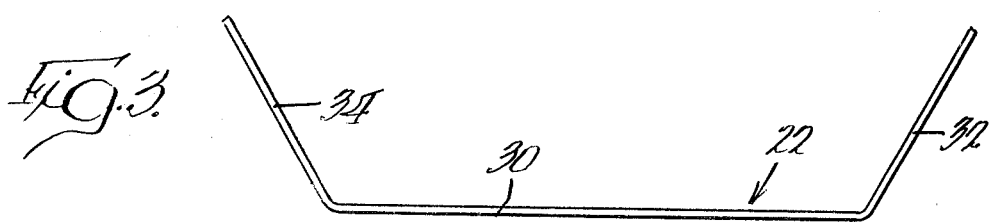

SAFETY SHIELD ASSEMBLY

BACKGROUND OF THE INVENTION

The present invention relates to shields for use with machine tools to deflect materials ejected from work areas thereof.

In various machining operations such as grinding, buffing, polishing, drilling, milling, etc., chips, broken tools, or coolant where used, are occasionally ejected from the work areas of the machines and can present a hazard to an operator thereof or other nearby personnel. In an attempt to minimize and hopefully prevent injuries caused by such ejected material, and for other reasons, the Occupational Health and Safety Act of 1970 was enacted, and requires in part that one or more methods of machine guarding be provided to protect the operator and other employees in the machine area from hazards such as those created by point of operation, rotating parts, or flying chips.

Customarily, protection against flying chips and the like is provided by shields extending across the forward sides of the work areas. Such shields generally mount in or in close proximity to the work areas, and when moved aside either the mount or the shield itself often impedes access to the area. Further, upon change of the workpiece setup, the mount must often be repositioned to clear the new setup. Quick change mounts such as those having magnetic bases, while intended to alleviate the aforementioned problems, scratch and tend to be bumped off the machine mounting surface, sometimes into the work area itself. Thus, present day protective shields are generally very inconvenient to use and adjust, which often results in improper or even lack of use of such shields.

OBJECTS OF THE INVENTION

Accordingly, an object of the present invention is to provide an improved shield for a work area of a machine tool, which forms an effective barrier to material ejected therefrom.

Another object of the invention is to provide such a shield which is easily and readily movable and adjustable in any position either adjacent to or remote from the work area.

A further object of the invention is to provide such a shield which is easily mountable on various types of machines at any convenient location remote from the work area thereof.

A still further object of the invention is to provide a shield for machine tools, which is of a transparent material and is configured to effectively surround the front and sides of the work areas thereof.

A further object of the invention is to provide such a shield for machine tools, all the major surfaces of which are essentially planar to allow undistorted viewing of the work area therethrough.

Yet another object of the invention is to provide such a shield which is mounted on a universal arm and includes a handle to facilitate operator movement thereof between various positions.

SUMMARY OF THE INVENTION

In accordance with the present invention, a safety shield assembly for a cutting, milling, abrading or other tool includes a unitary, generally U-shaped transparent shield having a center portion and a pair of side leg portions. An arm, having a plurality of movable joints, is secured at one of its ends to the shield and is mountable at an opposite end to the machine remote from a work area thereof. The arm is universally movable to support the shield both in a position in front of the work area with the center portion between the work area and an operator station and with the side legs extending away from the operator station across opposite sides of the work area, and at positions remote from the work area.

Preferably the shield if formed of a durable and impact resistant polymeric material, such as polycarbonate, the center portion is generally rectangular and planar, and the side legs are generally planar and extend out of the plane of the center portion. The upper edges of the center and side leg portions are generally coplanar, and the lower edges of the side legs are beveled toward the upper edges thereof from the lower edge of the center portion. The one end of the arm is rotatably secured to one of the side legs, and a handle is fastened to that side leg and may be gripped by an operator of the machine to move the shield on the arm to the various positions. The arm includes joint adjusting means for controlling its resistance to movement.

Thus the invention provides a shield which is adjustably positionable to effectively block material ejected from a work area of a machine, the shield being transparent and planar to allow an undistorted view therethrough of the work area, and being readily movable to a plurality of positions remote from the work area to enable unimpeded access to the area.

The foregoing objects of the invention are thus achieved with particular facility and economy. Other objects, advantages, and features of the invention will become apparent upon a consideration of the following description thereof, when taken in conjunction with the appended drawings.

BRIEF DESCRIPTION OF THE DRAWINGS

FIG. 1 is a perspective view of a shield structured in accordance with the teachings of the present invention, mounted on a universal arm to a machine tool for shielding a work area thereof;

FIG. 2 is a front elevation view of the shield; and

FIG. 3 is a top plan view of the shield, particularly illustrating the planar surfaces thereof for undistorted viewing therethrough.

DETAILED DESCRIPTION

Referring to the drawings, the shield assembly of the present invention, generally indicated at 20, includes a shield 22 secured to an end of a universal or jointed arm 24. The shield 22 is positionable on the arm around the forward sides of a work area 26 of a cutting, milling, abrading, or other machine tool, such as the drill press shown generally at 28, to prevent passage therepast of chips, broken tools, coolant, etc. which might be ejected at high speed from the work area during a machining operation. In this manner, the shield affords protection both to an operator of the machine at a operator station forward the work area, as well as to other nearby personnel. While not shown as comprising a part of the present invention, a second shield is preferably positioned rearward of the work area to afford similar protection to personnel rearward of the machine.

More particularly, the shield 22 is of an integral polymeric material which is preferably highly transparent to allow clear viewing of the work area therethrough, and yet is sufficiently shatterproof and durable to resist impact thereagainst of ejected material, a suitable material being polycarbonate. The shield is generally U-shaped, and has an essentially rectangular and planar center portion 30 and a pair of generally planar side leg portions 32 and 34 which extend out of the plane of the center portion at any desired angle, such as at an angle of about 60°. The upper edges of the center portion and the side legs are generally coplanar. However, since the shield when positioned in front of a work area is normally tilted upward for optimum viewing therethrough, the lower edges of the side legs are beveled toward the upper edges thereof, generally at an angle of about 30°, to give maximum operator protection at an optimum viewing angle.

The arm 24 is rotatably secured at one of its ends 36 to the side leg 34 through a passage 37 formed therein, and is mountable at an opposite end, as by a bracket 38, to the machine or some other fixture (not shown) remote from the work area. The arm is of the universal type, and is comprised of a pair of arm sections 40a and 40b which are joined together and to the bracket and shield by a plurality of flexible knees or joints 42a-d which allow rotative and pivotal movement of the arm sections both with respect to each other and with respect to the bracket and shield. The jointed arm and its rotatable connection to the shield thus allow movement of the shield thereon between an operator protecting position adjacent and around the forward sides of the work area and various positions remote from the work area. Preferably the resistance of the joints to movement is selectively adjustable, as by thumbscrews 44, to provide a desired degree of support to the shield or to accommodate shields of various sizes and weights.

For convenience in moving the shield to its various positions, an operator gripping handle 46 is fastened to the side leg 34. This is accomplished most readily by securing one end of the handle between the end 36 of the arm and the side leg, and the other end of the handle to the side leg as with a fastener 48 extending through a passage 50 formed in the leg.

During a machining operation when the shield is positioned between the work area and the operator station, the transparent and planar center and leg portions thereof permit a clear and unobstructed view therethrough of the work area. Then, at the end of the machining operation, or when operator access to the work area is otherwise required, the shield is readily movable on the arm to a position remote from the work area to allow unimpeded access thereto.

A particular advantage of the shield assembly is that it is adapted to be mounted and used on a wide variety of machines. Heretofore, shields or face guards have been designed for particular machines, thereby limiting interchangeability. The universally jointed arm of the present assembly also allows the shield to be employed in a horizontal, vertical or angular position, as may be required by different machines. Furthermore, the adjustable arm allows the shield to be moved very close to the working portion of the machine, which allows the operator to more closely inspect the work while providing protection for the face and eyes.

While one particular embodiment of the invention has been described in detail, it is understood that various other modifications and embodiments thereof may be devised by one skilled in the art without departing from the spirit and the scope of the invention, as defined by the appended claims.

What is claimed is:

1. In a safety shield assembly for abrading of cutting tools and the like, a unitary, generally U-shaped transparent shield having a generally planar center portion and a pair of generally planar side leg portions extended out of the plane of said center portion; an arm having a plurality of movable joints, said arm being secured at one of its ends to one of said pair of side leg portions and being mountable at an opposite end to said machine remote from a work area thereof, said arm being movable to support said shield at a position in front of said work area with said center portion between said work area and an operator station and with said side leg portions extending away from said operator station toward opposite sides of said work area, and to support said shield at positions remote from said work area; and a handle fastened to said shield, grippable by an operator of said machine to move said shield on said arm to said positions.

2. In a safety shield assembly as set forth in claim 1, wherein said shield is transparent plastic, and wherein said handle is fastened to said one of said side leg portions.

3. In a safety shield assembly as set forth in claim 2, wherein said shield is rotatably secured to said one end of said arm.

4. In a safety shield assembly as set forth in claim 3, wherein said arm includes joint adjusting means for controlling the resistance to movement of said joints.

5. In a safety shield assembly as set forth in claim 4, wherein said center portion of said shield is generally rectangular, the upper edges of said center portion and said side leg portions are generally coplanar, and the lower edges of said leg portions are beveled toward said upper edges thereof from the lower edge of said center portion.

6. In a safety shield assembly as set forth in claim 1, wherein said shield is formed from polycarbonate.

* * * * *